United States Patent
Destain et al.

(10) Patent No.: US 8,777,427 B2
(45) Date of Patent: Jul. 15, 2014

(54) SHORT THROW PROJECTION LENS WITH A DOME

(75) Inventors: Patrick Rene Destain, Allen, TX (US); James Hallas, Plano, TX (US); Steve Smith, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 915 days.

(21) Appl. No.: 12/332,047

(22) Filed: Dec. 10, 2008

(65) Prior Publication Data

US 2010/0141902 A1   Jun. 10, 2010

(51) Int. Cl.
G03B 21/22 (2006.01)
G03B 21/14 (2006.01)
G03B 21/28 (2006.01)

(52) U.S. Cl.
CPC ............... G03B 21/14 (2013.01); G03B 21/28 (2013.01); G03B 21/145 (2013.01); G03B 21/147 (2013.01)
USPC .......................................................... 353/119

(58) Field of Classification Search
CPC .................................................. G03B 21/145
USPC ........................................ 353/69, 70, 79, 119
See application file for complete search history.

(56) References Cited

U.S. PATENT DOCUMENTS

| | | | | |
|---|---|---|---|---|
| 4,705,343 A * | 11/1987 | Simons | ................. | 359/354 |
| 6,520,646 B2 * | 2/2003 | Rodriguez et al. | ............ | 353/69 |
| 7,277,226 B2 * | 10/2007 | Cossairt et al. | ............... | 359/446 |
| 2004/0141157 A1 * | 7/2004 | Ramachandran et al. | ...... | 353/70 |
| 2006/0119806 A1 * | 6/2006 | Dwyer et al. | ................... | 353/119 |
| 2006/0256290 A1 * | 11/2006 | Imahase et al. | ................. | 353/20 |
| 2006/0290897 A1 * | 12/2006 | Engle et al. | ..................... | 353/70 |
| 2007/0024821 A1 * | 2/2007 | Devos et al. | .................... | 353/74 |
| 2007/0285624 A1 * | 12/2007 | Rodriguez et al. | ............. | 353/70 |
| 2008/0297726 A1 * | 12/2008 | Rodriguez et al. | ............. | 353/13 |
| 2009/0079946 A1 * | 3/2009 | Chen et al. | ..................... | 353/69 |
| 2010/0039379 A1 * | 2/2010 | Hildreth | ....................... | 345/156 |

* cited by examiner

Primary Examiner — Thanh Luu
Assistant Examiner — Danell L Owens
(74) Attorney, Agent, or Firm — Warren L. Franz; Frederick J. Telecky, Jr.

(57) ABSTRACT

The present invention relates to an outer dome configured to provide protection and optical correction to a system of projection optics and the output thereof. More particularly, an optical projection system having an optical offset of greater than 100% is comprised within a projector housing having an outer dome comprised of an optically active material mounted onto an opening approximately coinciding with the optical projection system's exit pupil. The outer dome is configured to be decenterized from the exit pupil (e.g., the center of the dome is offset from the exit pupil in one or more of an x, y, and z direction) such that it provides optical correction to a projected image. Therefore, an outer dome is configured to provide protection to optical elements provided therein and improvement of projected image quality (e.g., reduced image distortion, reduced aberration).

17 Claims, 7 Drawing Sheets

SHORT THROW PROJECTION LENS WITH A DOME

FIELD OF INVENTION

The present invention relates generally to an optical projection system and method of forming an optical projection system and more particularly to an outer dome mounted on a projection system configured to provide protection to the system and improved image quality to a projected image.

BACKGROUND OF THE INVENTION

In recent years large screen televisions (e.g., having a horizontal screen dimension greater than 37 inches) have become commonplace in many consumer's homes. This is in large part due to the emergence of new types of display systems which have made cathode ray tube (CRT) televisions obsolete in the large screen television market. One such type of display system is a projection display system (e.g., rear projection (RP) televisions, front projection projectors), wherein a projection lens is used to project an image onto a screen. Television sets and projectors have been developed that use projection lenses to support large projected image sizes at a reasonable cost. Projection lenses may be used for either front or rear projection, depending on whether the lens is on the viewer side of the screen or behind the screen. Often front projection lenses are used in projectors while rear projection lenses are used in televisions.

In a front projection system, the projector and viewer are on the same side of the display surface, with the image from the projector reflecting from the display surface to the viewer. An optical system utilizes light engine and projection optics to project an image directly on a display surface. It is desirable in such systems to have a short throw distance. The throw distance of a projection system is given by the projection distance d divided by the diagonal length D of a display surface, wherein the diagonal D is measured from the opposite corners of the display surface. Projectors with a short throw distance can provide large images for projectors placed at close distances from a projection screen (e.g., in small home theatre rooms, classrooms, small meeting rooms, etc.).

A typical projector system can utilize short-throw, wide-angle lenses with an on-axis optical path. This has an advantage of limiting depth reductions, but does so at the cost of a more complex design (e.g., even though keystone distortion is not present, this approach still requires optical elements that are challenging to design and manufacture). The optical and geometric constraints manifest themselves as increased pincushion or barrel distortion and keystone distortion. The design of prior art systems has largely been constrained by the requirement of minimizing these distortions along with achieving a required Modulation Transfer Function (MTF), correcting for lateral color, and meeting lens F-number specifications, while satisfying cost-performance tradeoffs.

Prior art rear projection systems use screen assemblies that have low reflectance to light impinging on them from the front (by use of light absorbing materials) in order to provide a high contrast ratio. These screen assemblies also have a high transmittance for light impinging on them from the rear (by use of lenticular arrays and collimation of light) in order to provide high brightness. Light is typically collimated by using a Fresnel lens as part of the screen assembly. A Fresnel lens is a symmetrical circular structure (its optical center is located at the physical center, or on the axis of the projection light path) for on-axis projection systems. A Fresnel lens of a given focal length substitutes for a large circular plano convex lens of the same focal length. The diameter of such a Fresnel lens is at most the length of the display diagonal. These Fresnel lenses are typically thin, very flexible and expand with interior temperature rise. The image quality for on-axis projection systems is not very sensitive to variations in the central portion (around the optical axis) of a Fresnel lens' surface profile. Unfortunately, when these symmetrical Fresnel lenses are used in off-axis RP systems (e.g., the off axis projection lenses use the off axis portion of an on axis Fresnel lens) they become problematic very quickly when the offset becomes high (e.g., angle of incident greater than 60°). In addition, the Fresnel lens in off-axis RP systems must be carefully designed because the light impinges on the rear of the screen at incident angles that vary from a minimum near the bottom of the screen of from 0±5 degrees to a maximum of up to 80±5 degrees near the top of the screen. Accordingly, the collimation must be performed with very high incident angles. Unfortunately, Fresnel lenses in short throw configurations are highly susceptible to image distortion due to screen flatness problems when the angle of incident becomes very steep.

SUMMARY OF THE INVENTION

The following presents a simplified summary in order to provide a basic understanding of one or more aspects of the invention. This summary presents one or more concepts of the invention in a simplified form as a prelude to the more detailed description that is presented later and is not an extensive overview of the invention. In this regard, the summary is not intended to identify key or critical elements of the invention, nor does the summary delineate the scope of the invention.

The present invention relates to an outer dome configured to provide protection to a system of projection optics and improvement to image quality output thereof. More particularly, an optical projection system having an optical offset of greater than 100% is comprised within a projector housing having an outer dome comprised of an optically active material mounted onto an opening approximately coinciding with the optical projection system's exit pupil. The outer dome is configured to be decenterized from the exit pupil (e.g., the center of the dome is offset from the exit pupil in one or more of an x, y, and z direction) such that it provides optical correction to a projected image.

Essentially, a projection system having aberration (e.g., spherical aberration) in the exit pupil and a distortion in the image plane (image distortion) is configured to have a decenterized outer dome located between the projection optics and a projection target external to the projector (e.g., a projection screen). The decenterized outer dome protects the projection system from physical harm and introduces a second order distortion to the projected image. This second order distortion corrects distortion in the image plane resulting in a projected image with improved image quality (e.g., reduced image distortion, aberration).

The following description and annexed drawings set forth in detail certain illustrative aspects and implementations of the invention. These are indicative of but a few of the various ways in which the principles of the invention may be employed.

DETAILED DESCRIPTION OF THE INVENTION

Figure 1:
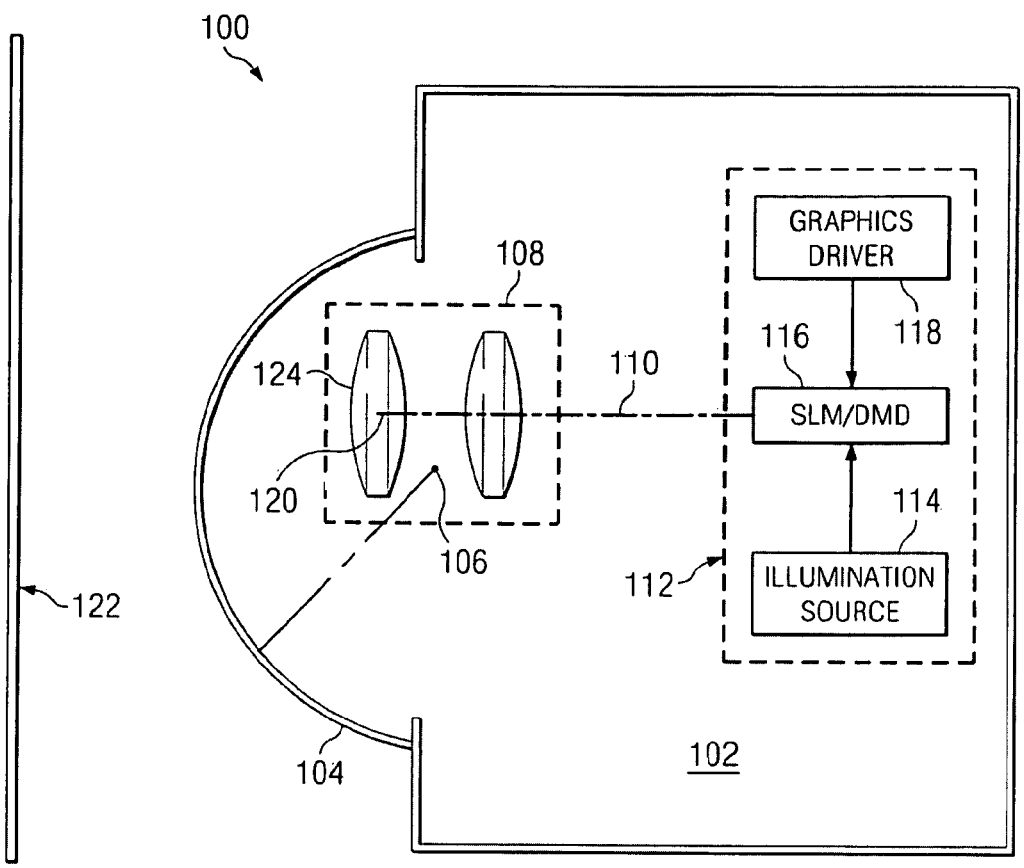
FIG. 1 illustrates a first embodiment of an optical projection system provided herein comprising an outer dome configured between projection optics and a projection target external to the projector.

The present invention will now be described with reference to the attached drawing figures, wherein like reference numerals are used to refer to like elements throughout, and wherein the illustrated structures and devices are not necessarily drawn to scale.

As provided herein the present invention relates to an outer dome comprised of an optically active material configured to provide protection and improvement to image quality (e.g., reduced image distortion, aberration) of illumination output from a system of projection optics. More particularly, an optical projection system having aberration in the exit pupil (e.g., divergence between the source of an optical system's chief rays not intersecting at one point) and an optical offset of greater than 100% is comprised within a projector which outputs an image having distortion in the image plane (image distortion). A decenterized outer dome (e.g., an outer dome with a center of curvature not coincident to the exit pupil extending through the optical axis of the projection system) is mounted onto an opening approximately coinciding with the optical projection system's exit pupil such that the optical dome is located between the projection optics and a projection target external to the projector (e.g., a projection screen). The outer dome is configured to provide protection to optical elements provided therein and correction of image distortion (e.g., by introducing a second order distortion to the projected image) resulting in a projected image with improved image quality (e.g., reduced distortion). It will be more fully appreciated below that optical systems provided herein (e.g., element 100, element 500) are characterized by two distinguishing features: (1) decenterization of the outer dome off of the projection system's exit pupil (i.e., an off axis placement of the outer dome); and (2) an image offset of over 100% (e.g., described in FIGS. 2A and 2B).

FIG. 1 illustrates a first embodiment of the projection system invention as provided herein, where an outer dome comprised of an optically active material is mounted onto an opening in a projection housing through which illumination must pass to exit the projection system. The projection system 102 is comprised of an illumination module 112 and a group of projection optics 108. As shown in FIG. 1, the illumination module 112 is based upon a spatial light modulator (SLM) or other lightvalve (e.g., digital micro-mirror device (DMD)) design and is configured to provide illumination comprising image data to the group of projection optics 108. An illumination source 114 provides illumination to one or more DMD's 116 which are controlled by a graphics driver 118. The graphics driver 118 will tilt the one or more DMD's 116 to respectively provide a plurality of projected pixels forming an image. Illumination passes from the one or more DMD's 116 through projection optics 108 to an outer optical dome 104.

In one embodiment (shown in FIG. 1), the projection optics 108 are configured to have an exit pupil 120 (i.e., an image of the (real or virtual) aperture as seen through the front lens of an optical system) located within the front lens 124 (e.g., corresponding to wide angle projection systems often having an exit pupil within the front group of lenses). In an alternative embodiment the projection optics 108 are configured to have an exit pupil 120 located outside of the front lens 124.

An optical axis 110 extends from the one or more DMD's 116 to the exit pupil 120. The optical axis is an imaginary line that defines the path along which light propagates through the projection system without being deviated. The optical axis is often coincident with the projection system's mechanical axis and often intersects the center of the DMD, however in off-axis optical projection systems the optical axis and the mechanical axis (i.e., defined as the line intersecting the optical element at their physical center) are not coincident.

Referring again to FIG. 1, the outer dome 104 is configured to be decentered such that the center of curvature 106 of the outer dome 104 does not align with the exit pupil 120 intersecting the optical axis 110 of the projection optics 108. This misalignment of the outer dome 104 and the exit pupil 120 is known as decenterization. It will be appreciated that decenterization can occur in any of the x, y, or z direction as defined in Euclidean space (e.g., the dome can have a center of curvature 106 above or below the exit pupil 120, inside or outside of the exit pupil 120, or left or right of the exit pupil 120). Since the image offset is greater than 100%, decenterization of the dome to improve image quality is only concerned with a subset of the field of view over which the image is projected (i.e., an image with offset greater than 100% is not projected onto 100% of the field, but just the upper or lower part of it). As a consequence, the decenterized alignment of the outer dome from the optical system, aberration in the exit pupil (i.e., variance of pupil position and shape vs. the field view) and image distortion are only relevant for a subset of the field of view.

The outer dome 104 both provides physical protection and modification of an optical projection system's optical properties (e.g., improve image quality). For example, the dome protects from scratches, fingerprints and other damage resulting from external contact with the optical elements. In one particular embodiment the outer dome 104 hermetically encloses the optical elements (e.g., 108, 114, 116) thereby preventing distortion due to air temperature and humidity variations. Furthermore, the outer dome 104 modifies (e.g., reduces) image quality of projected illumination. For example, in one embodiment the outer dome modifies exit pupil aberration in order to correct for image distortion, resulting in an outer dome 104 that modifies (e.g., reduces) both the exit pupil aberration (e.g., causes a reduction in the divergence between the source of an optical system's chief rays) and the image distortion, however it will be appreciated that only modification (e.g., correction) of the image distortion is visible in the projected image. In alternative embodiments, the outer dome modifies different types of aberration for projected images.

It will be appreciated that in alternative embodiments the projection optics may comprise any set of projection lenses that have an optical offset of greater than 100% and preferably with aberration in the exit pupil (e.g., aberration in the exit pupil position and not geometrically in the image).

Figure 2A:
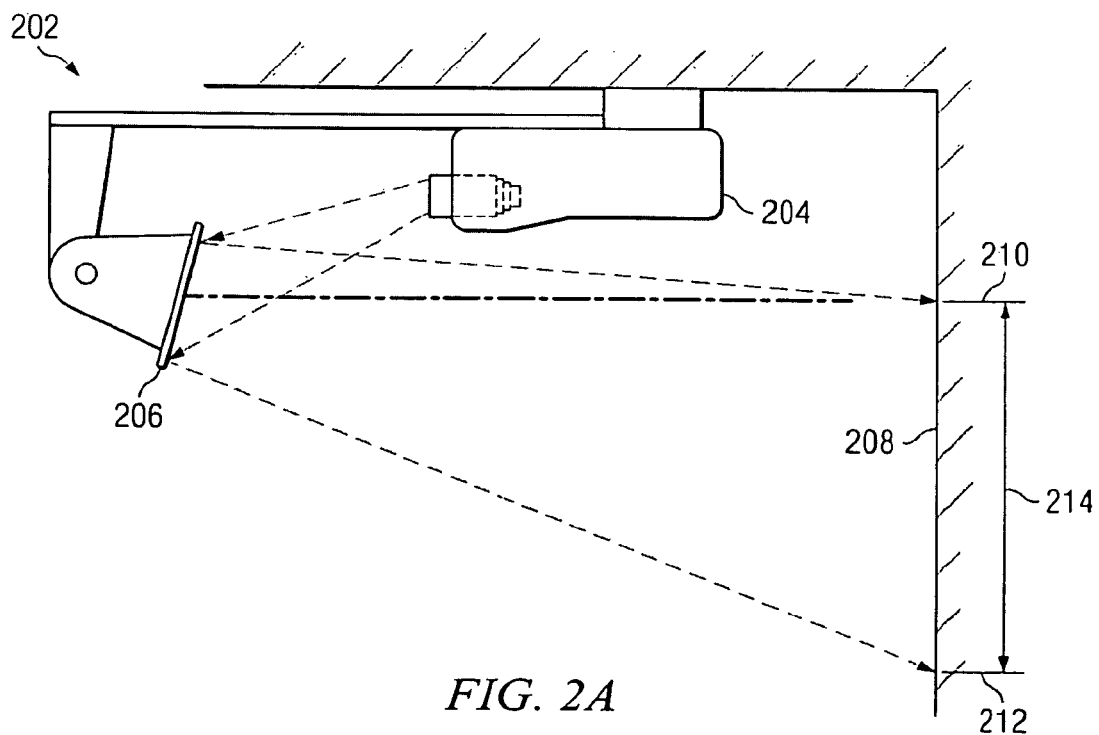
FIG. 2A illustrates a projector having an offset of 100 percent.
Figure 2B:
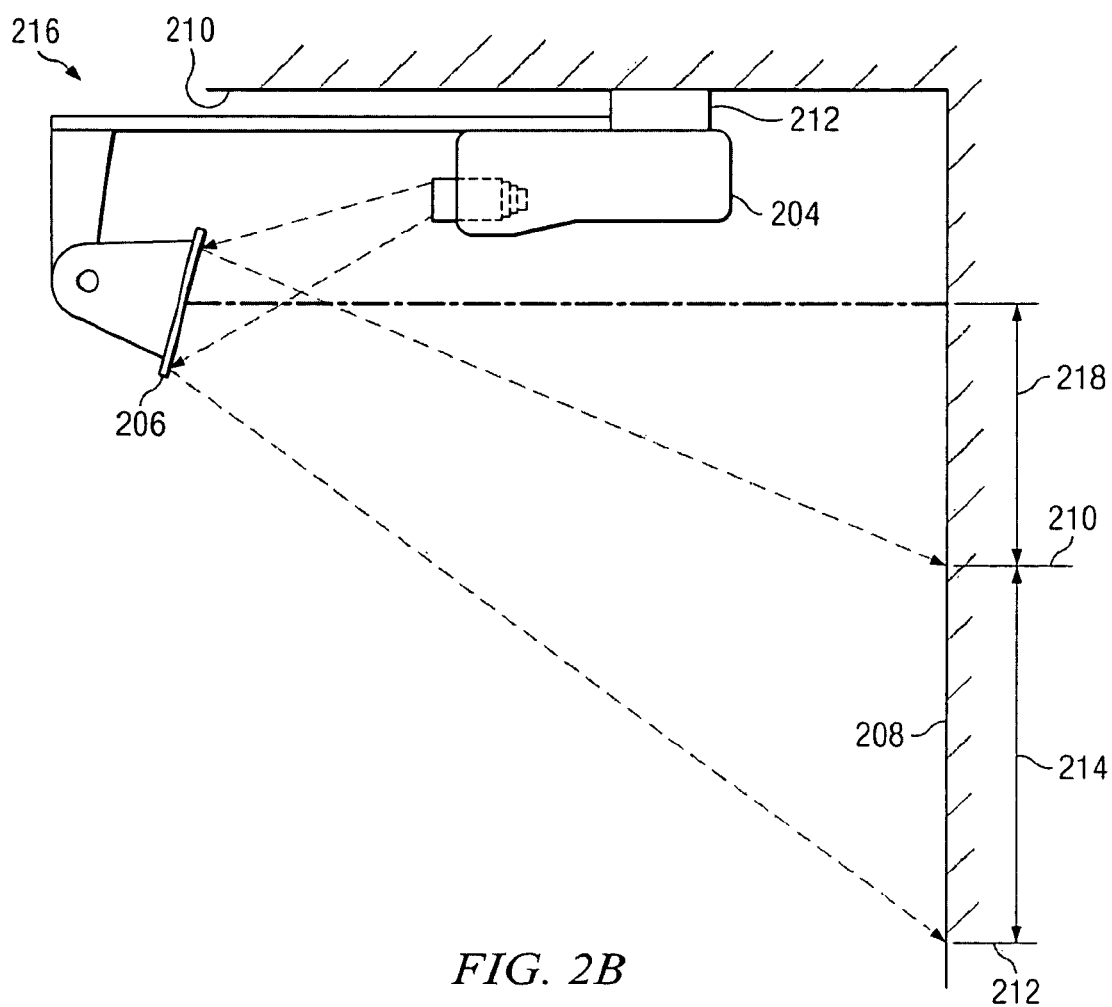
FIG. 2B illustrates a projector having an offset of greater than 100 percent.

FIGS. 2A and 2B illustrate projection systems, 202 and 216, having different image offsets. The image offset is determined from the lateral offset in distances from the center of a lens/mirror to the top or bottom of the projected image. Image offset is presented as a percentage that is directly related to an image's height (i.e., image offset=DMD height/(2×lateral offset)*100%). For example, if the lateral offset is ½ the DMD height the offset is 100%. The physical distance the image is offset from the center of the lens is equal to the percentage image offset multiplied by the image height. For example, FIG. 2A shows a projector 204 having an image offset of 100%. In FIG. 2A, the projector 204 projects an image onto a display screen 208. The top 210 of the projected image 214 is substantially horizontally aligned with the center of the projection mirror 206. Therefore, since the center of the projection mirror 206 and the top 210 of the image 214 are aligned, the image offset is 100%. FIG. 2B shows a projector 204 projecting an image 214 having a top 210 that is projected above the center of the projection mirror 206, resulting in an image offset of greater than 100% (i.e., the image is offset from the center of the mirror by a vertical distance of 218, where distance 218 is greater than 0).

It will be appreciated that in many very short throw (VST) projectors the image offset is usually much greater than 100%. This is because the light is incident upon the projection optics at a high angle to provide a large image at a very short throw distance. In one embodiment the present invention can be applied to an optical system having a short throw ratio (e.g., 0.15 of less), wherein throw ratio is defined as throw distance/screen size. For example, a projector having a distance between the projector lens and the screen of 1 ft and a projection width of 6⅔ feet would have a throw ratio of 0.15.

Figure 3:
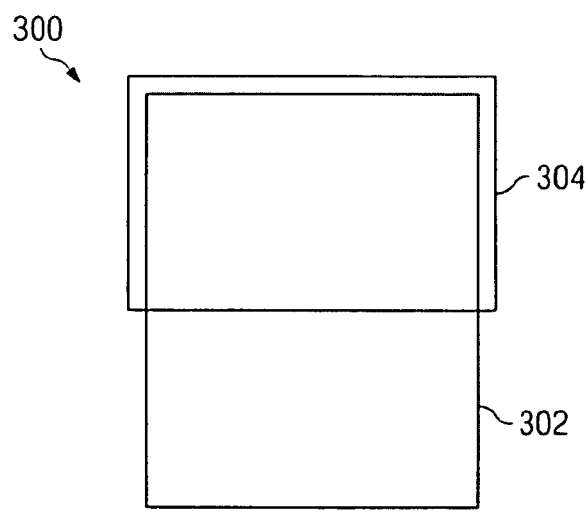
FIG. 3 illustrates the projection of a projector having an on axis digital micro-mirror device (DMD) and a projector having an off axis DMD.

FIG. 3 illustrates a field of view produced by a projection system having an on axis DMD and an off axis DMD (i.e., lightvalve). By changing the location of a DMD within an optical projection system (e.g., to have an on axis DMD or an off axis DMD) different parts of the field of view can be utilized and ignored. For example, when a DMD is placed off axis (e.g., corresponding to an image offset greater than 100%) only the top half of the projection lenses are used (i.e., the effect of having an off axis DMD is that only illumination from the top half of the projection lens is projected), while an on axis DMD (e.g., corresponding to an image offset of 0%) utilizes the entire projection lens. FIG. 3 shows the projected image, shown onto a projection screen, of an optical system having an off-axis DMD 304 and an optical system having an on axis DMD 302. The optical system having an on axis DMD projects an entire image (shown as box 302). Alternatively, the optical system having an off axis DMD only projects the upper half of an image (shown as box 304). The difference between optical systems having an on axis DMD and optical systems having an off axis DMD is that in optical systems having an off axis DMD the distortion correction only has to be provided for the upper half of the projection element and can be ignored for the lower half. Therefore, use of the outer dome provided herein with an optical system having an off axis DMD provides distortion compensation to the upper half of the projection element and ignores the lower half (e.g., an optical system having an off axis DMD allows optical correction with a decentered dome while an optical system with an on axis DMD can't take advantage of that degree of freedom). Therefore, it will be appreciated that the optical dome provided herein can be configured to improve the quality of an output image (e.g., reduce distortion) of any system having an off axis projection DMD.

In an alternative embodiment, the effect shown in FIG. 3 (i.e., projection of only the upper half of the image for off axis DMDs) can be achieved using an on axis DMD. In such an embodiment a DMD is positioned on axis and only the upper half of the DMD is used to project an image. This results in an image projection described by element 304.

Figure 4:
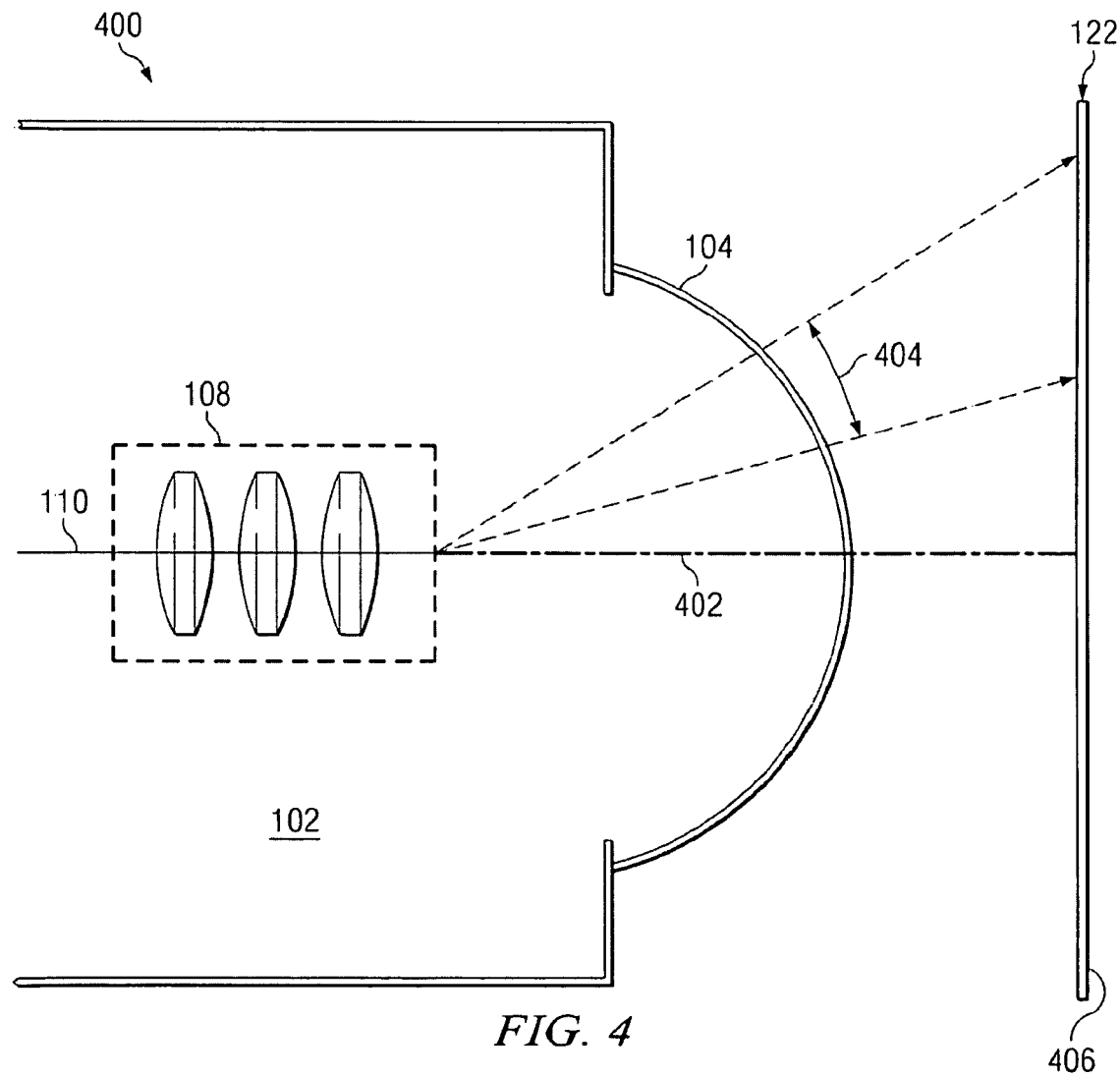
FIG. 4 illustrates an optical projection system provided herein wherein illumination is projected through an off axis region of the outer dome.

FIG. 4 illustrates a projection system 400 along with an illumination path for an optical system having an image offset of greater than 100%. As shown in FIG. 4, the projection optics 108 are configured along an optical axis 110 which extends to the exit pupil 120. A virtual axis 402 extends from the optical axis 110 beyond the exit pupil 120 and the outer dome 104 is configured substantially along the virtual axis 402. Illumination output from the projection optics 108 is projected at an offset of greater than 100% thereby causing the illumination to be projected through an off axis (e.g., the image is displayed off of the virtual axis) region of the outer dome 404 (i.e., 406 illustrates an off axis projection analogous that shown in FIG. 2B) which provides improvement to the image quality of the output illumination.

Therefore, the outer dome 104 provided herein is attractive as an optical element because through decenterization and an image offset of greater than 100%, only a subset of the entire field of view (e.g., the upper half) is used (i.e. pupil distortion is only relevant for half of the field of view) for projection and therefore only that subset must offer optical correction of image quality. Removing a requirement for symmetric placement of an outer dome 104 (e.g., allowing the outer dome to be placed off axis) gives a degree of freedom to decenter the outer dome 104 and removes projection of a subset of the field of view. This allows an optical projection system having greater than 100% offset to be concerned with the image quality of only a subset of the field (e.g., ½ of the field) and therefore allows asymmetric optical correction of the projected image. For example, image distortion correction can be introduced which improves image quality in the upper half of the field of view (e.g., FIG. 3, element 304) and decreases image quality in the lower half of the field of view without decreasing the projected image quality.

Figure 5A:
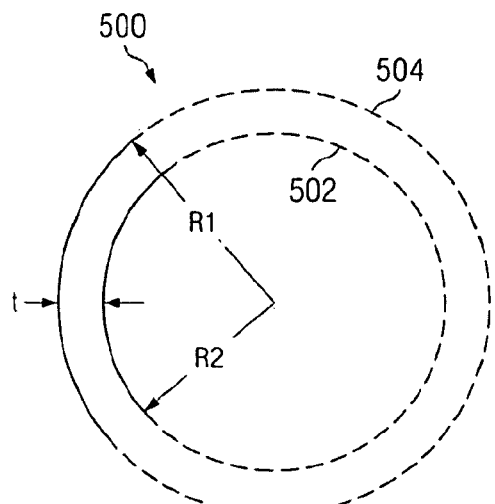
FIG. 5A shows a schematic diagram of an outer dome as provided herein having spherical curvature.
Figure 5B:
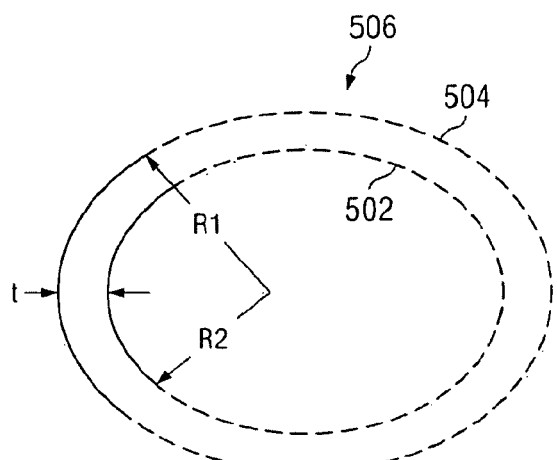
FIG. 5B shows a schematic diagram of an outer dome as provided herein having conical curvature.

FIGS. 5A and 5B illustrate schematic diagrams of possible designs for an outer dome provided herein. The outer dome provides a robust yet flexible design which offers image distortion correction while being able to be formed according to a number of different shapes. In one embodiment, the outer dome 104 is comprised of a plastic material (e.g., molded acrylic) that is easily manufactured. Geometrically, the outer dome is characterized by an inner surface, located at a distance of $R1(\Theta)$ from the center of curvature, and an outer surface, located at a distance of $R2(\Theta)$ from the center of curvature, where $R2(\Theta) > R1(\Theta)$ (i.e., $R2(\Theta) = R1(\Theta) + t(\Theta)$, where t=the thickness of the outer dome and $\Theta$ portion of outer dome through which illumination will pass).

In one particular embodiment the thickness of the outer dome, t, is substantially constant (e.g., within variations in manufacturing parameters) over the entire surface of the outer dome (i.e., inner and outer surfaces are substantially concentric) resulting in an outer dome with a high degree of symmetry. Such an embodiment provides an especially simple outer dome structure which can be easily manufactured at a low cost. For example, in one embodiment illustrated in FIG. 5A the outer dome is shown having a spherical curvature (i.e., $R1(\theta)$=constant, $R2(\theta)$=constant). In an alternative embodiment illustrated in FIG. 5B, the outer dome has a conic curvature (i.e., a curvature resulting from intersecting a cone with a plane) (e.g., elliptical, parabolic, etc.). In both embodiments the inside surface 502 of the outer dome is separated from the outside surface 504 of the outer dome by a substantially equal distance for both outer dome shapes (i.e., $R2(\theta)=R1(\theta)+t$).

In an alternative embodiment the thickness of the outer dome is configured to vary over the surface of the outer dome (i.e., $R2(\Theta)=R1(\Theta)+t(\Theta)$, where $t(\Theta)$ varies over $\Theta$). For example, the outer dome can be configured to have different thicknesses over $\Theta$ resulting in an aspheric prescription (e.g., inner and outer surface are not concentric). Such an embodiment would have a wide range of optical properties and could be configured to provide more powerful image distortion correction. However, it will be appreciated that domes which are specifically manufactured to have aspheric image correction would be more demanding to manufacture than simpler domes (e.g., constant thickness domes). For example, such domes would be very large (e.g., to cover the entire field of view), more expensive, harder to mold, and require greater manufacturing precision.

Figure 6:
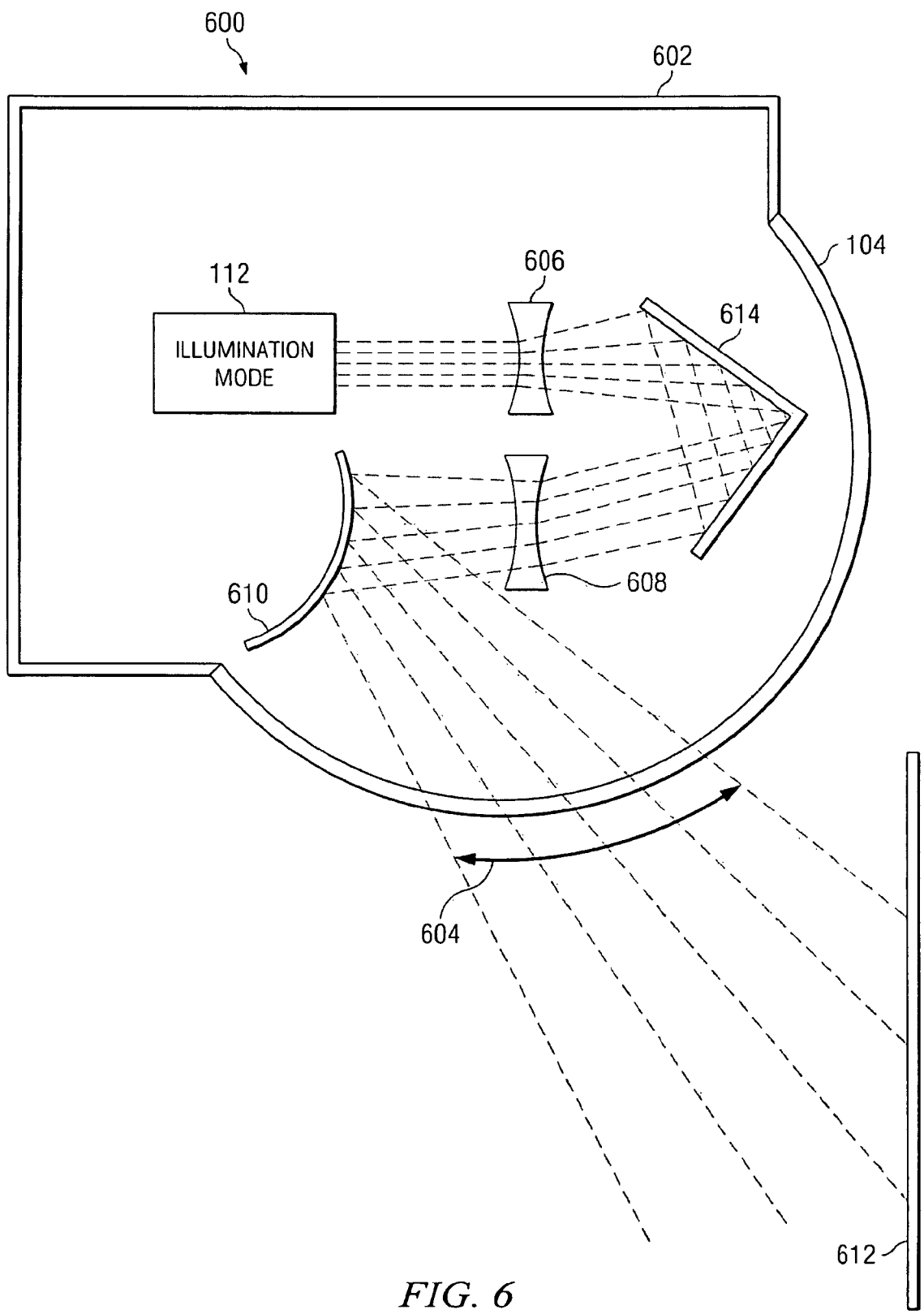
FIG. 6 illustrates a more detailed embodiment of the optical projection system provided herein comprising aspheric surfaces in the front end group of lenses.

FIG. 6 illustrates an additional embodiment of the present invention wherein a projection system 600 having aspheric projection optics is comprised within an outer dome 104.

Figure 7:
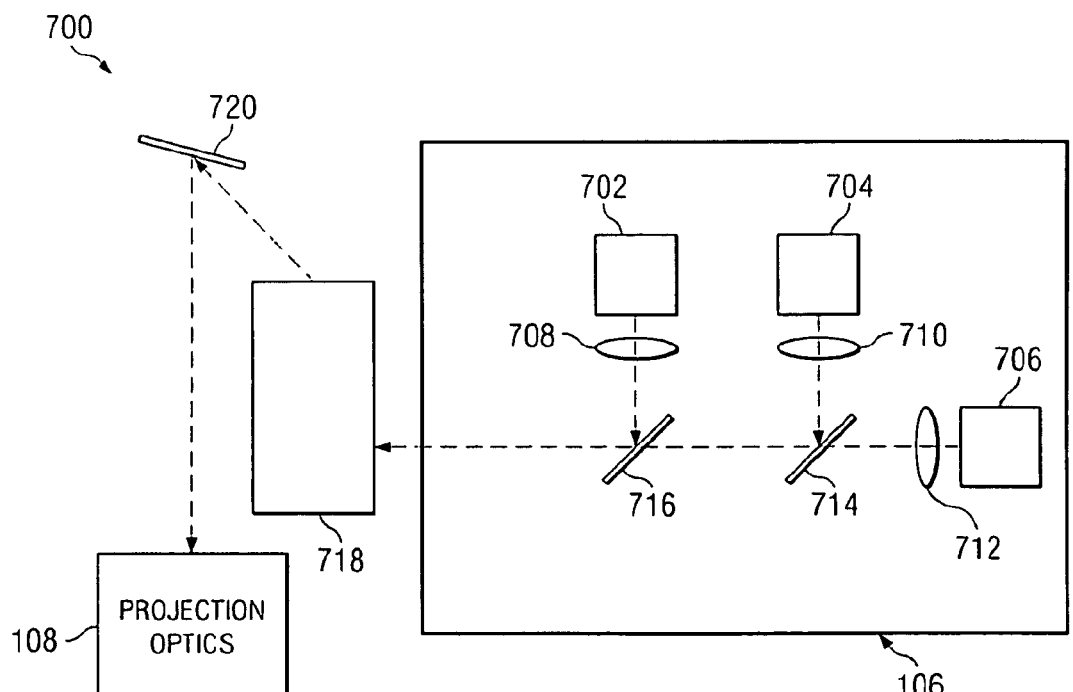
FIG. 7 illustrates an exemplary optical engine comprising light emitting diodes (LED's) to provide illumination to a digital micro-mirror device (DMD)

As shown in FIG. 6, the illumination module 104 comprises a digital micro-mirror device (DMD) based system, however alternative lightvalves may also be used. FIG. 7 illustrates an exemplary illumination module 600 based upon a DMD design. In FIG. 7 a plurality of LED's (702, 704, 706) act as illumination sources to provide illumination of different wavelengths (e.g., LED 702 outputs light at a wavelength of 650 nm, LED 704 outputs light at a wavelength of 510 nm, LED 706, outputs light at a wavelength of 475 nm) that travels through an optical train comprising a front group of lenses (708, 710, 712) (e.g., a condenser), dichroic plates (714, 616), a rear group of lenses 718, and a DMD 720. As shown in FIG. 7, dichroic plates (714, 716) are positioned to reflect light from an associated LED (e.g., dichroic plate 716 will reflect light from LED 702) while allowing light from other LED's to pass through the dichroic plate (e.g., dichroic plate 716 will allow light from LED's 704 and 706 to pass). The rear group of lenses 718 will convey light from the LED's (702, 704, 706) to the DMD 720. Often a rear group of lenses 618 will comprise a plurality of lenses substantially arranged along an optical axis and located within a lens barrel. The DMD 720 uses an array of microscopic mirrors that build an image by rapidly switching the DMD "on" and "off" in response to the image data received by the graphics driver. The DMD comprises mirror elements that are fabricated over a semiconductor substrate, which has a memory cell associated with each mirror element. The mirrors of the mirror elements of the DMD operate such that they are in either an on or an off position for each image. Rotation of the mirrors is accomplished with electrostatic attraction produced by voltage differences developed between the mirror and the underlying memory cell. For example, one mirror position may be tilted at an angle of +10 degrees while the other mirror position is tilted at an angle of −10 degrees. The light incident of the face of each mirror is directed to a set of projection optics as shown in FIG. 6. One skilled in the art will appreciate that the illumination module of FIG. 7 may comprise alternative optical elements. For example, an organic light emitting diodes (OLED), LASER (e.g., vertical cavity surface emitting lasers (VC-SEL)) or other suitable light emitting devices may be used as an illumination source.

Referring again to FIG. 6, the projection optics comprise two lenses, 606 and 608, having an aspheric prescription (a first aspheric lens and a second aspheric lens) and a mirror 610 having an aspheric prescription (an aspheric mirror). Both the first aspheric lens 606 and the second aspheric lens 508 comprise a first and a second aspheric surface. The aspheric mirror 610 comprises a convex surface configured to receive illumination from the second aspheric lens and relay the illumination to a solid angle of the outer dome to a display screen 612. Each aspheric component surface (e.g., the aspheric lenses and the aspheric mirror) is configured to have a prescription which will reduce image distortion (e.g., curve on the edge of a projection screen) from the system. Furthermore, as previously stated the outer dome will provide a second order correction to image distortion (i.e., correction to the quadratic term of the image distortion).

For example, illumination is output from the illumination module 112 and is received by the first aspheric lens 606. The first aspheric lens 606 has an aspheric prescription that will reduce image distortion of the received illumination. The first aspheric lens 606 relays the illumination through the optical train to a second aspheric lens 608. The second aspheric lens 608 also has an aspheric prescription that will reduce the image distortion of the illumination. The second aspheric lens 608 relays the illumination to the aspheric mirror 610. The aspheric mirror 610 comprises a convex surface having an aspheric prescription. The convex aspheric surface will reduce image distortion of the illumination and reflect and spread out the solid angle of the illumination to be output over an area 604 of the outer dome 104 that is a subset of the outer dome 104. The illumination reflected from the aspheric mirror will be projected in a manner that provides a large image with minimal optical aberration onto the display screen 612 at a short throw distance.

The number of aspheric surfaces used within the projection system may vary for different designs. FIG. 6 illustrates a projection system having 5 aspheric surfaces (e.g., two aspheric lenses and an aspheric mirror), however a projection system may alternatively comprise three aspheric surfaces, for example (e.g., one aspheric lens and an aspheric mirror). While the number of aspheric surfaces may exceed five, it will be appreciated that in general, as a larger number of aspheric surfaces is used, it becomes difficult to keep the optical quality over the entire field therefore causing a degradation in performance and reliability of the optical projection system.

Referring again to FIG. 6, a fold mirror 614 can optionally be placed into the optical train between the first aspheric lens 606 and second aspheric lens 608. The fold mirror 614 will reflect the illumination received from the first aspheric lens 506 in another direction. By reflecting the received illumination in another direction the overall length of the optical train (i.e., envelope) is reduced allowing for a more compact projection unit. For example, a rear projection television (RPTV) utilizing the optical projection system of FIG. 6 comprising a fold mirror can achieve a weight reduction of up to 30 pounds for a 46 inch screen.

The use of a fold mirror 614 to decrease the size of the optical train of the projection system (e.g., reduces the cabinet depth or the size of the projector housing) allows for smaller and lighter projector units which can be used for a wide range of applications. For example, in one embodiment the compact design of the optical projection system could allow a thin display screen (e.g., less than half an inch thick) to be configured above a stand comprising the projection system. In an alternative embodiment the compact design of the optical projection system could be utilized in a white board application and placed adjacent to a display screen. In either such application the compactness of the system is essential to the application, however, such compactness that would leave the VST lens exposed would subject the system to the possibility of physical damage.

As previously discussed, the outer dome of the optical projection system shown in FIG. 6 does not require objective compensation because the field of view provided by the outer dome is asymmetric with respect to the optical axis. This means that the outer dome will provide improved optical distortion to the output illumination if the outer dome is either centered along the axis of the optical system or placed off of the axis.

Figure 8A:
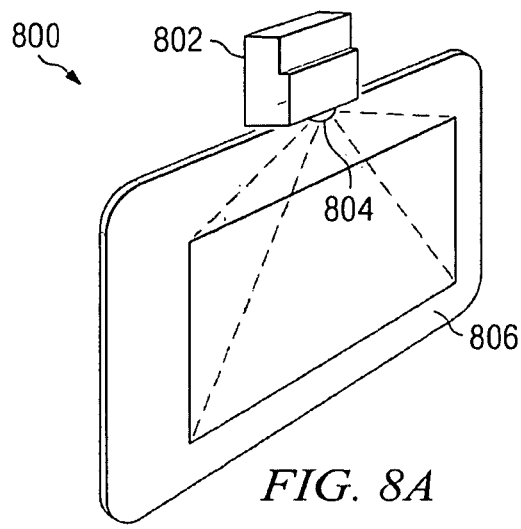
FIG. 8A illustrates a diagram of an interactive whiteboard comprising the optical projection system provided herein.

In alternative embodiments, the aspheric optical elements (606, 608, 610) and the outer dome 104 can be decentered to provide varying optical properties. For example, in one embodiment the aspheric optical elements and the outer dome can be decentered with respect to a virtual axis extending through the projector opening. In an alternative embodiment the aspheric lenses can be decentered with respect to the center of the curvature of the outer dome FIG. 8A shows one particular embodiment of the present invention wherein the optical projection system provided herein is used in an interactive, electronic whiteboard configuration 800. In such an embodiment the optical system is comprised within a projector 802 that is adhered to a wall located above a display screen 806. The projector is in close proximity to the wall and therefore offers a projection system that does not intrude the room. The outer dome 804 is configured to protect the optics and provide image distortion compensation as provided herein. Therefore, the optical system comprised within the projector 802 provides a compact projection system that is easily integrated into classroom or boardroom setting without requiring a cumbersome projection system.

In particular, the use of an outer dome on a ultra short throw projector is especially important for such an interactive white board as shown in FIG. 8A comprising a stretched film (e.g., metallic or other dielectric film stretched over a honeycomb or any flat structure) with a high degree of flatness. Typically, Ultra Short Throw (UST) projectors require excellent screen flatness in order to avoid "local distortion" of a projected image. Use of an UST projector on a white board having a flat film screen provides an excellent opportunity to project an undistorted image on a stretched screen at no additional cost.

Figure 8B:
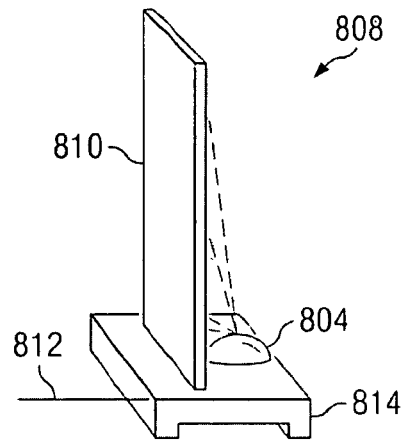
FIG. 8B illustrates a diagram of an interactive whiteboard comprising the optical projection system provided herein.

FIG. 8B shows an alternative embodiment of the present invention wherein the optical projection system provided herein is implemented into a rear projection television (RPTV) 808. In such an embodiment the optical projection system remains under the chin 812 of the RPTV. In one particular embodiment the optical projection system is comprised within the base of the television 814 thereby allowing the screen 810 to be kept at an extremely thin width. The outer dome 804 can be mounted onto the base of the television 814 to protect the elements of the optical projection system from damage by external elements and provide optical distortion compensation.

Figure 9A:
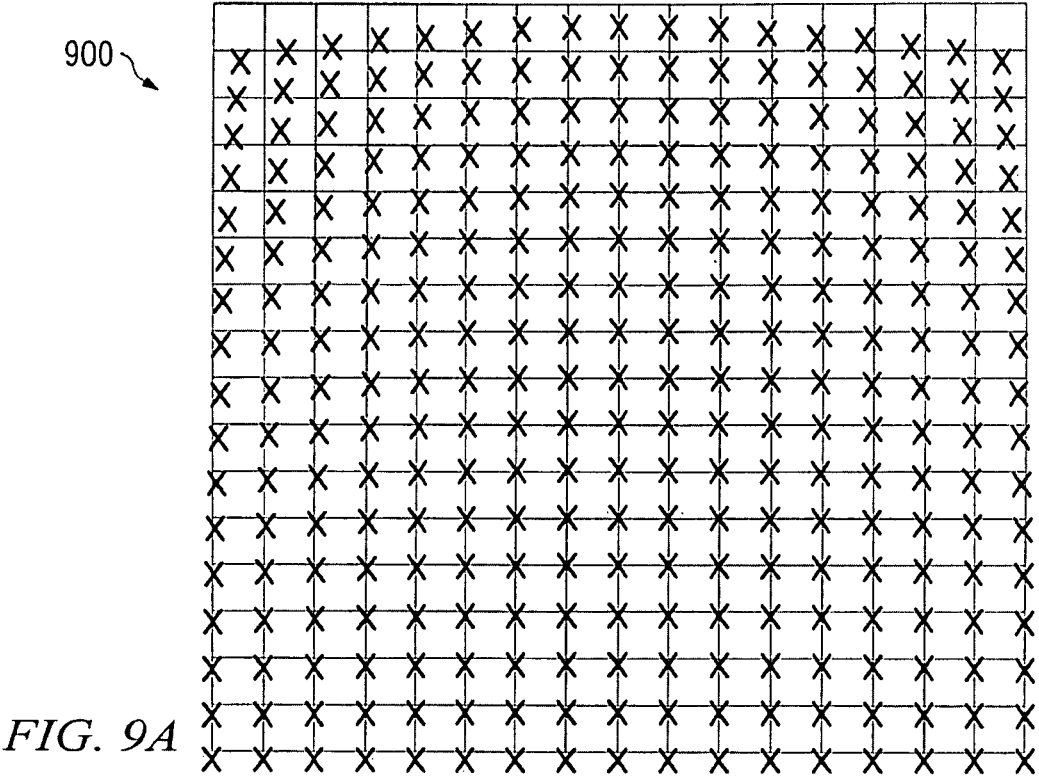
FIG. 9A illustrates the distortion of an optical system not comprising an outer dome as provided herein.
Figure 9B:
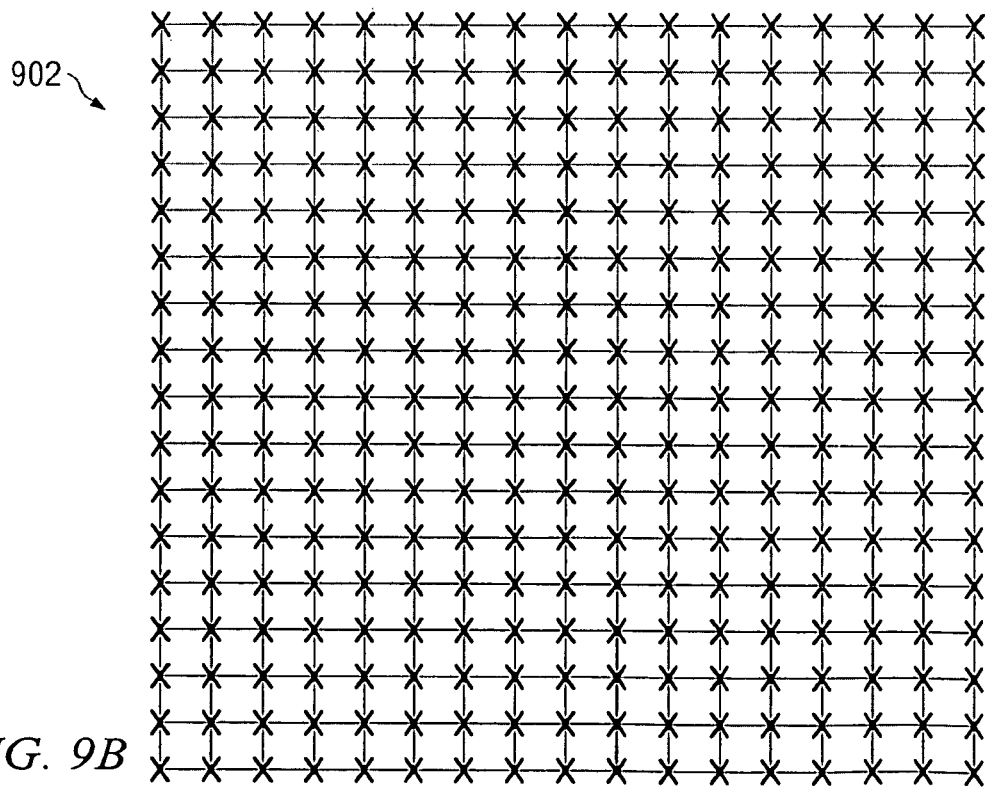
FIG. 9B illustrates the distortion of an optical system comprising an outer dome as provided herein.

FIGS. 9A and 9B, respectively illustrate the distortion of the exit pupil for an optical system not having the outer dome and distortion of the exit pupil for an optical system having the outer dome for the upper half of an optical element (e.g., optical offset >100%). In FIGS. 9A and 9B grid lines illustrate the position of projected pixels in an ideal optical system having no distortion. The lowercase x's illustrate the position of projected pixels. The optical system not having the outer dome, illustrated in FIG. 9A, shows a barrel distortion, wherein the pixels location deviates from the ideal location (e.g., given by the grid) in the upper left and right corners of the projected image. The optical system comprising an outer dome, illustrated in FIG. 9B, provides distortion compensation. Therefore, the pixel location of the projected image deviates less when the outer dome is used to correct the optical distortion. For example, in the optical system of FIGS. 9A and 9B distortion of the exit pupil has been reduced from ~3% to ~0.11% by including an outer dome as provided herein to the optical system.

Figure 10:
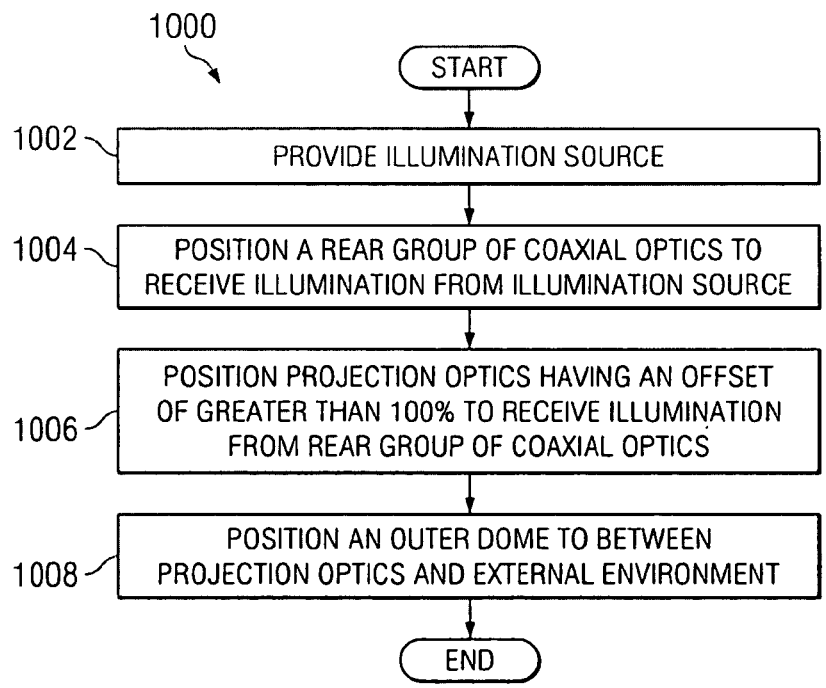
FIG. 10 illustrates a method for generating an optical system a provided herein.

FIG. 10 shows one embodiment of the present invention, a methodology 1000 for generating an optical system as provided herein. While method 1000 is illustrated and described below as a series of acts or events, it will be appreciated that the illustrated orderings of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

At 1002 an illumination source is provided. The illumination source may comprise one or more LED's in one embodiment. Alternatively, organic light emitting diodes (OLED), vertical cavity surface emitting lasers (VC-SEL) or other suitable light emitting devices may be used as an illumination source.

A rear group of optics is provided at 1004. The rear group comprises one or more lenses often configured coaxially around the optical axis. The rear group of optics is configured to receive illumination from the illumination source and relay the illumination to a SLM (e.g., DMD).

At 1006 a group of projection optics having an offset of greater than 100% is provided. The projection optics are configured to received illumination from the rear group of coaxial optics. The projection optics may comprise any combination of projection optics which have an offset of greater than 100%. In one particular embodiment, the projection optics comprise two or more aspheric lenses and a VST aspheric mirror. Illumination is conveyed through the two or more aspheric lenses to the VST aspheric mirror. As illumination is conveyed by each aspheric surface the distortion of the illumination is reduced.

At 1008 an outer dome is configured between the projection optics and the external environment. The outer dome protects the projection optics and provides image distortion compensation to illumination passing through the outer dome. In one particular embodiment the dome is decenterized from the optical axis of the projection optics thereby providing an aberration in the exit pupil.

It will be appreciated in the embodiments provided herein the elements comprising the illumination module and the projection optics may be varied so long as the resultant optical system provides an offset of greater than 100%. The inventors have contemplated a wide variety of optical system to be used in conjunction with the present invention provided herein.

Furthermore, although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method of projecting an image onto a display surface with an image offset of greater than 100% and a throw ratio of 0.15 or less, comprising:
    providing an illumination source, a spatial light modulator and projection optics within a housing having an opening;
    modulating light received from the illumination source using a spatial light modulator;
    projecting the modulated light with the projection optics along an optical axis to an exit pupil generally aligned with the housing opening, the projection optics having optical properties to correct for image pixel grid distortion in an image formed by the projected light;
    providing a light transparent dome mounted over the housing opening providing physical protection for the projection optics and having a center of curvature decentered by an offset in one or more of x, y and z directions from alignment with the exit pupil extending through the optical axis; and
    transmitting the light projected by the projection optics through the light transmitting dome, the dome having optical properties to further correct for image pixel grid distortion in the image formed by the projected light.

2. The method of claim 1, wherein the dome has a substantially equal thickness along a solid angle at a portion of the dome through which the projected light passes.

3. The method of claim 1, wherein the dome has a spherical curvature.

4. The method of claim 1, wherein the dome has a conic curvature.

5. The method of claim 1, wherein the dome forms a hermetic seal with the housing.

6. The method of claim 1, wherein the projection optics comprises:
    a plurality of aspheric surfaces configured to receive the modulated light and provide a reduction in optical aberration; and
    a mirror with an aspheric prescription.

7. The method of claim 6, wherein the plurality of aspheric surfaces are decenterized with respect to the opening.

8. The method of claim 1, wherein the projection optics comprises:
    a first lens having an aspheric prescription, wherein the first lens is configured to receive the modulated light from the spatial light modulator and provide some of the partial image edge curvature distortion correction;
    a second lens having an aspheric prescription, wherein the second lens is configured to receive the modulated light from the first lens and provide some more of the partial image edge curvature distortion correction; and
    a mirror having an aspheric prescription and a convex surface, wherein the mirror is configured to receive the modulated light from the second lens, spread out the received light, and project the spread out light to form the image onto a display screen.

9. The method of claim 8, further comprising:
    a fold mirror configured to receive the modulated light from the first lens and to convey the received modulated light to the second lens, thereby reducing the distance from the illumination source to the aspheric mirror.

10. The method of claim 9, wherein the method is a method for projecting an image in an interactive electronic white board configuration.

11. The method of claim 9, wherein the method is a method for projecting an image in a rear projection television.

12. The method of claim 1, wherein the modulated light projected by the projection optics passes through a portion of the dome that has a substantially equal thickness.

13. The method of claim 1, wherein the illumination source comprises a light emitting diode (LED) die.

14. The method of claim 13, wherein the projection optics comprises a plurality of aspheric surfaces configured to provide the partial image edge curvature distortion correction.

15. The method of claim 1, wherein the spatial light modulator in off-axis relative to the optical axis.

16. The method of claim 15, wherein the spatial light modulator is a digital micro-mirror device.

17. The method of claim 16, wherein the projection optics is configured to provide a first order distortion correction to the projected image; and the dome is configured to provide a second order distortion correction to the projected image.

* * * * *